US009047409B2

(12) United States Patent
Dressler et al.

(10) Patent No.: US 9,047,409 B2
(45) Date of Patent: Jun. 2, 2015

(54) METHOD FOR PROCESSING DATA OF A CONTROL UNIT IN A DATA COMMUNICATION DEVICE

(75) Inventors: Marc Dressler, Horn-Bad Meinberg (DE); Bastian Kellers, Paderborn (DE); Daniel Hofmann, Paderborn (DE); Thorsten Hufnagel, Salzkotten (DE)

(73) Assignee: dSPACE GmbH, Paderborn (DE)

( * ) Notice: Subject to any disclaimer, the term of this patent is extended or adjusted under 35 U.S.C. 154(b) by 253 days.

(21) Appl. No.: 13/570,974

(22) Filed: Aug. 9, 2012

(65) Prior Publication Data
US 2013/0042079 A1 Feb. 14, 2013

(30) Foreign Application Priority Data

Aug. 9, 2011 (DE) .......................... 10 2011 052 510

(51) Int. Cl.
*G06F 11/36* (2006.01)
*G06F 11/07* (2006.01)
(52) U.S. Cl.
CPC ........ *G06F 11/3656* (2013.01); *G06F 11/0739* (2013.01); *G06F 11/0709* (2013.01); *G06F 11/0793* (2013.01)
(58) Field of Classification Search
CPC .......................... G06F 11/0793; G06F 11/0709
See application file for complete search history.

(56) References Cited

U.S. PATENT DOCUMENTS

| 5,956,756 A * | 9/1999 | Khalidi et al. ................ 711/207 |
| 6,349,312 B1 * | 2/2002 | Fresko et al. ........................ 1/1 |
| 7,020,754 B1 * | 3/2006 | Walton et al. ................. 711/162 |
| 7,454,555 B2 | 11/2008 | Ware et al. |
| 2003/0145255 A1 * | 7/2003 | Harty et al. ...................... 714/48 |
| 2006/0251416 A1 * | 11/2006 | Letner et al. ..................... 398/45 |
| 2007/0226544 A1 * | 9/2007 | Woodhouse .................... 714/45 |
| 2008/0127108 A1 * | 5/2008 | Ivanov et al. ................. 717/128 |
| 2011/0246836 A1 * | 10/2011 | Walker et al. ................... 714/45 |
| 2012/0297254 A1 * | 11/2012 | Shazly ............................. 714/45 |
| 2013/0031308 A1 * | 1/2013 | De Spiegeleer et al. ...... 711/122 |
| 2013/0305099 A1 * | 11/2013 | Ionescu et al. ................. 714/45 |

FOREIGN PATENT DOCUMENTS

DE 10 2006 062 555 A1 7/2008

OTHER PUBLICATIONS

Doru Daniel Diculoiu, *ECU Services User's Guide*, dSPACE digital processing and control engineering GmbH (May 4, 2002).

* cited by examiner

*Primary Examiner* — Aimee Li
*Assistant Examiner* — Edmund Kwong
(74) *Attorney, Agent, or Firm* — Muncy, Geissler, Olds & Lowe, P.C.

(57) ABSTRACT

A method for processing data of a control unit in a data communication device, which has a first memory area and a second memory area, and is connected to the control unit through an interface. Data from the control unit is transmitted to the data communication device through the interface. A value is stored identically in the first memory area and in the second memory area. The data communication device tests whether a first trigger is present, and if present, storage in the first memory area is discontinued, or the trigger class of the first trigger is tested and storage in the first memory area is discontinued only in the presence of a predefined trigger class. Subsequently, values of the data are read out from the first memory area, whereby values arriving chronologically after the first trigger are stored in the second memory area by the data communication device.

11 Claims, 9 Drawing Sheets

METHOD FOR PROCESSING DATA OF A CONTROL UNIT IN A DATA COMMUNICATION DEVICE

This nonprovisional application claims priority under 35 U.S.C. §119(a) to German Patent Application No. DE 10 2011 052 510.6, which was filed in Germany on Aug. 9, 2011, and which is herein incorporated by reference.

BACKGROUND OF THE INVENTION

1. Field of the Invention

The invention relates to a method for processing data of an electronic control unit in a data communication device.

2. Description of the Background Art

A method for processing data of a control unit in a data communication device is known from DE 10 2006 062 555 A1. In this method, data from the control unit are stored in an arbitrary memory area of the data communication device. In addition to the acquisition of data from a control unit, the processing of data in the data communication device should also be understood to include, for example, the writing of data by the communication device.

As is shown in FIG. 8, a control unit SG is connected to a data communication device DK through an interface ST, wherein the data communication device DK has multiple memory areas S1, S2 and each data item of the data D is stored in only one of the multiple memory areas. Data D from the control unit SG are transmitted to the data communication device DK through the interface ST.

A method for transmitting data D of a control unit SG to a data communication device DK is known from the DE 10 2006 062 555 A1, in which the data communication device DK contains a microcontroller, a memory, and an interface ST, preferably a debug interface. With the interface ST, which has what is known as a trace functionality, it is possible to monitor addresses to be observed in the memory of a control unit SG and to transmit the data D to the data communication device DK.

The data communication device DK has at least two memory areas S1, S2. The multiple memory areas are implemented, for example, as multiple physical memories or else as multiple areas of one physical memory. In the case of multiple physical memories, access to the memories takes place simultaneously, for example, whereas in the case of multiple memory areas of one physical memory, access does not take place simultaneously, but in alternation, for example. In another variant, some memory areas are separate memories while other memory areas belong to one physical memory.

As shown in FIG. 9, one data item DA from the set of data D contains an address A and a value W, wherein the address A is associated with one memory location of a memory in the control unit SG.

SUMMARY OF THE INVENTION

It is therefore an object of the invention to provide a method that further develops the conventional art.

According to an embodiment of the invention, a method is provided for processing data D of a control unit SG in a data communication device DG, wherein the data communication device DG has a first memory area S1 and a second memory area S2, and is connected to the control unit SG through an interface ST, and the data D are transmitted from the control unit SG to the data communication device DG through the interface ST. Each data item DA of the data D has an address A and a value W. A value W is stored identically in the first memory area S1 and in the second memory area S2. The data communication device DG tests whether a first trigger T1 is present. If the first trigger T1 is present, storage in the first memory area S1 is discontinued, or the trigger class of the first trigger T1 is tested and storage in the first memory area S1 is discontinued only in the presence of a predefined trigger class. Subsequently, values W of the data D are read out of the first memory area S1, with values W' arriving chronologically after the first trigger T1 being stored in the second memory area S2 by the data communication device DG.

An advantage of the method according to the invention is that consistent readout of values W from a memory area S1, S2 of the data communication device DG is made possible at a time when a trigger T1, T2 is present. Consistent readout of values W at a time means that precisely the values W of the data D are read out that are stored in the memory at the time of the arrival of the trigger, and that these values W have not already been overwritten by subsequent values W'.

In another embodiment, each value W is stored identically in the first memory area S1 and in the second memory area S2. If the first trigger T1 is present, additional values W' arriving chronologically after the first trigger T1 are stored in the second memory area S2 even if storage in the first memory area S1 is discontinued. By means of the identical storage of every value W and the storage of additional values W', all data D transmitted by the control unit SG are present in the second memory area S2.

In a further development, the data communication device DG tests whether a second trigger T2 is present. If the second trigger T2 is present, storage in the second memory area S2 is discontinued and values W of the data D are read out of the second memory area S2. By means of the identical storage of the values W in both memory areas S1, S2 until the arrival of the first trigger T1 and the storage of the additional values W' in the second memory area S2 until the arrival of the second trigger T2, a memory area with consistent values W for each trigger, which is to say values that are not overwritten after arrival of the trigger, is achieved. In advantageous fashion, the memory areas S1, S2 are read out independently of one another.

In another embodiment, the data communication device DG has a first data acquisition unit and a second data acquisition unit. If the first trigger T1 is present, the first data acquisition unit reads the values W out of the first memory area S1, and if the second trigger T2 is present, the second data acquisition unit reads the values W out of the second memory area S2.

The values W can be read out independently of one another by the data acquisition units because a separate memory area S1, S2 is associated with each trigger T1, T2.

A further development of discontinuation triggers is that the first trigger T1 has a first priority P1 and the second trigger T2 has a second priority P2. If the second priority P2 is higher than the first priority P1, the readout of the values W of the first memory area S1 is discontinued and the readout of the values W of the second memory area S2 is started. The values W are also read out consistently in the case of discontinuation triggers.

In another embodiment, the readout of the values W of the first memory area S1 is resumed after the readout of the values W of the second memory area S2.

In another embodiment, addresses of the first memory area S1 and/or of the second memory area S2 are associated with the first trigger T1 and also with the second trigger T2. In addition, the data communication device DG is connected to a data processing device. The values W read out of a first memory area S1 and/or out of a second memory area S2 are transmitted to the data processing device DG. Values W that are read out whose associated first trigger T1 has a lower priority P1 than the second trigger T2 of a still unfinished readout process are not transmitted to the data processing device until the values W whose addresses were associated with the second trigger T2 have been transmitted to the data processing device. In this way, even faster processing is ensured of the values W of a high priority trigger T2.

According to another further development, the data communication device DG has a first buffer memory PS1, which is associated with the first memory area S1. During the discontinuation of storage in the first memory area S1, additional values W of the data D are temporarily stored (buffered) in the first buffer memory PS1, and the buffered values W are stored in the first memory area S1 after the readout. As a result, the first memory area S1 is updated after the readout, so the first memory area S1 contains consistent values W afterwards.

In another embodiment, a first buffer memory PS1 is associated with the first memory area S1, and a second buffer memory PS2 is associated with the second memory area S2, wherein the first buffer memory PS1 and the second buffer memory PS2 are each implemented as a separate memory or as a part of a memory with multiple outputs.

In another embodiment, a common third buffer memory PS3 is situated upstream of the first buffer memory PS1 and the second buffer memory PS2. As a result of the upstream common buffer memory PS3, an overflow of the buffer memories PS1, PS2 associated with the memory areas is prevented, for example.

In another embodiment, access to the second memory area S2 is facilitated. Thus, the first memory area S1 has a first memory address and the second memory area S2 has a second memory address. In order to keep the second memory address of the value W in the second memory area S2, for example to write or read a value W in the second memory area S2, a predefined address value is added to the first memory address of the first memory area S1. The predefined address value is, for example, the difference between the first memory address and the second memory address. In order to read out values W in the prior art, address lists are used, for example, which specify the memory location where a value W is stored. As a result of the addition of the predefined address value, instead of an address list for each memory area S1, S2 only one address list is required for readout of values W, for example, and resources and configuration time are saved.

In another embodiment, the first trigger T1 is associated with precisely the first memory area S1, and the second trigger T2 is associated with precisely the second memory area S2. If the first trigger T1 is present, the values W are only read out of the first memory area S1, and if the second trigger T2 is present, the values W are only read out of the second memory area S2. This prevents the same values from being read out multiple times from different memory areas S1, S2 by means of one trigger.

In an embodiment, the first trigger T1 is not associated with the first memory area S1 until present in the data communication device DK. In another embodiment, the association of the first trigger T1 with the first memory area S1 is rescinded after the readout of the values W.

In another variant of the embodiment described above, a first trigger T1 has a trigger class and a second trigger T2 has a trigger class. The first memory area S1 and also the second memory area S2 are each associated with a trigger class, and at least one address is associated with each trigger class. A value W of a data item D is stored in each memory area with which is associated the trigger class associated with the address of the data item, so that a value W is stored in the first memory area S1 or in the second memory area S2 or is stored identically in both memory areas S1 and S2 based on the trigger class or trigger classes associated with the address of the data item.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
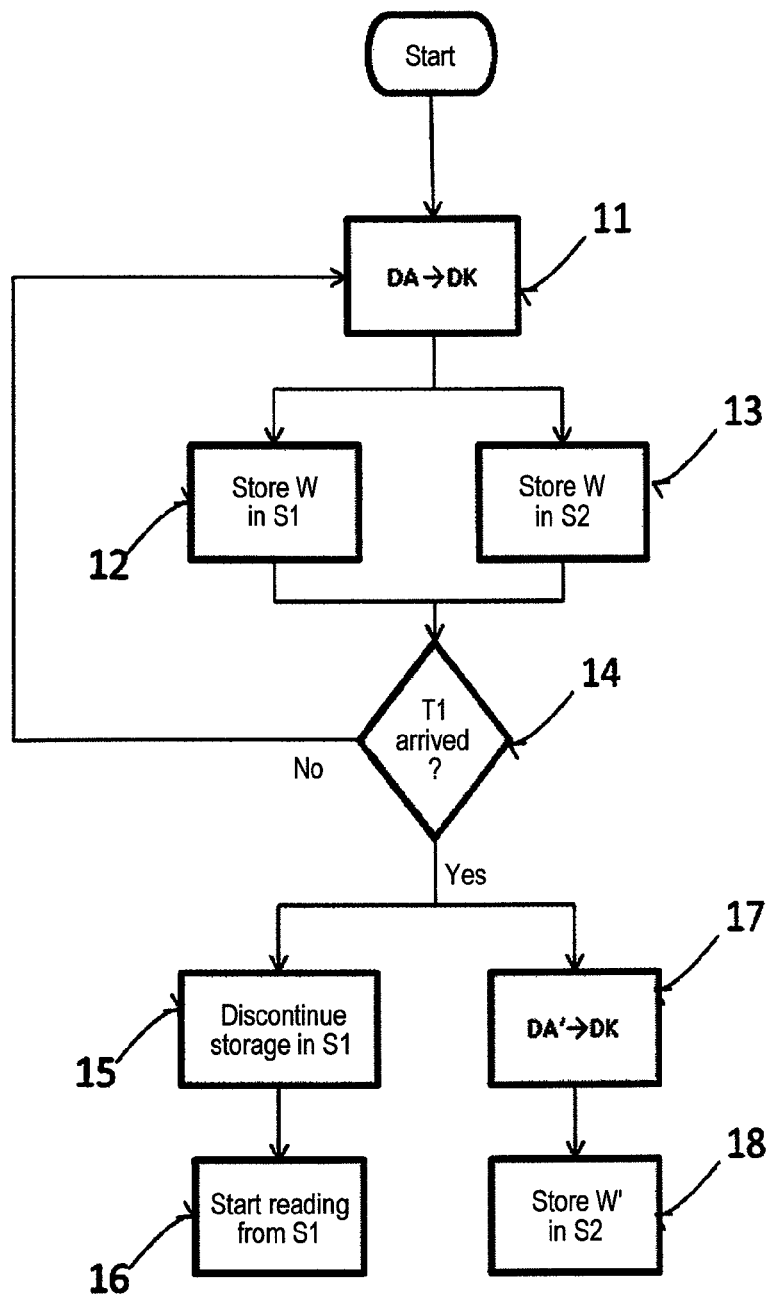
FIG. 1 is a schematic view of a first embodiment according to the invention of a method for processing data of a control unit in a data communication device.

The illustration in FIG. 1 shows a schematic view of a first embodiment.

In a first step 11 of the method, the data D are transmitted from the control unit SG to the data communication device DK through the interface ST.

The value W of each data item DA transmitted from the control unit SG is stored in the data communication device DK, and according to a step 12 is also stored in the first memory area S1, and according to a step 13 is stored in the second memory area S2 as well. If the data communication device DK has more than two memory areas intended for storing the data D, the value W of each data item DA preferably is likewise stored in the additional memory areas if the additional memory areas are not blocked for storage.

To store a value W at an address in multiple memory areas or to read out the values W of interest from a memory area, an address list is provided, for example for each memory area, by means of which an association is made between the address A of the data item DA and the memory location of the value W within the memory area S1, S2. In another embodiment, there is a common address list for all memory areas, and the values are written to the same address in each memory area or can be read from the same address independently of the memory area. In another embodiment, there is only one common address list for all memory areas, and an address value is added to the address of the first memory area by means of which the address of the second memory area is obtained. In like manner, an address value is added, for example for each additional memory area, by means of which the address of the applicable memory area can be obtained.

Next, in a step 14, the data communication device DK tests whether a first trigger T1 is present. Testing for the trigger T1 can be performed, for example, by a control unit—not shown—of the data communication device DK.

Triggers are generated upon previously defined events. Examples of events are when defined addresses of the memory of the control unit are written to, or when a threshold with respect to a value is exceeded. A trigger is generated in the control unit SG, for example, and preferably is transmitted with the data D to the data communication device DK. In a different embodiment, the trigger is a data record in the data D and is inserted in the data by a trigger detection unit, in particular configurable, of the data communication device DK. In another embodiment of the invention, the trigger is a data item or a data record.

If no first trigger T1 is present in the data communication device DK when the test is performed, the values W of the data D transmitted from the control unit SG continue to be stored in the multiple memory areas S1, S2.

In the event the first trigger T1 is present, the data communication device DK reads out the part of the values W defined by, in particular, the first trigger T1 from the first memory area S1 in order to process the values W, for example to measure them, display them, or use them for calculating regulating or control functions.

In order to read out the part of the values W defined by the first trigger T1, and to not overwrite the values W by values W' stored in the first memory area S1 after the presence of the first trigger T1, storage of additional values W' in the first memory area S1 is discontinued prior to readout of the part of the values W in a step 15.

After storage in the first memory area S1 has been discontinued, the readout of the values W in a step 16 is started.

At the same time, additional values W' are transmitted from the control unit SG in a step 17. In a step 18, the values W' are stored in the second memory area S2 or, according to another embodiment, are stored in the additional memory areas.

Figure 2:
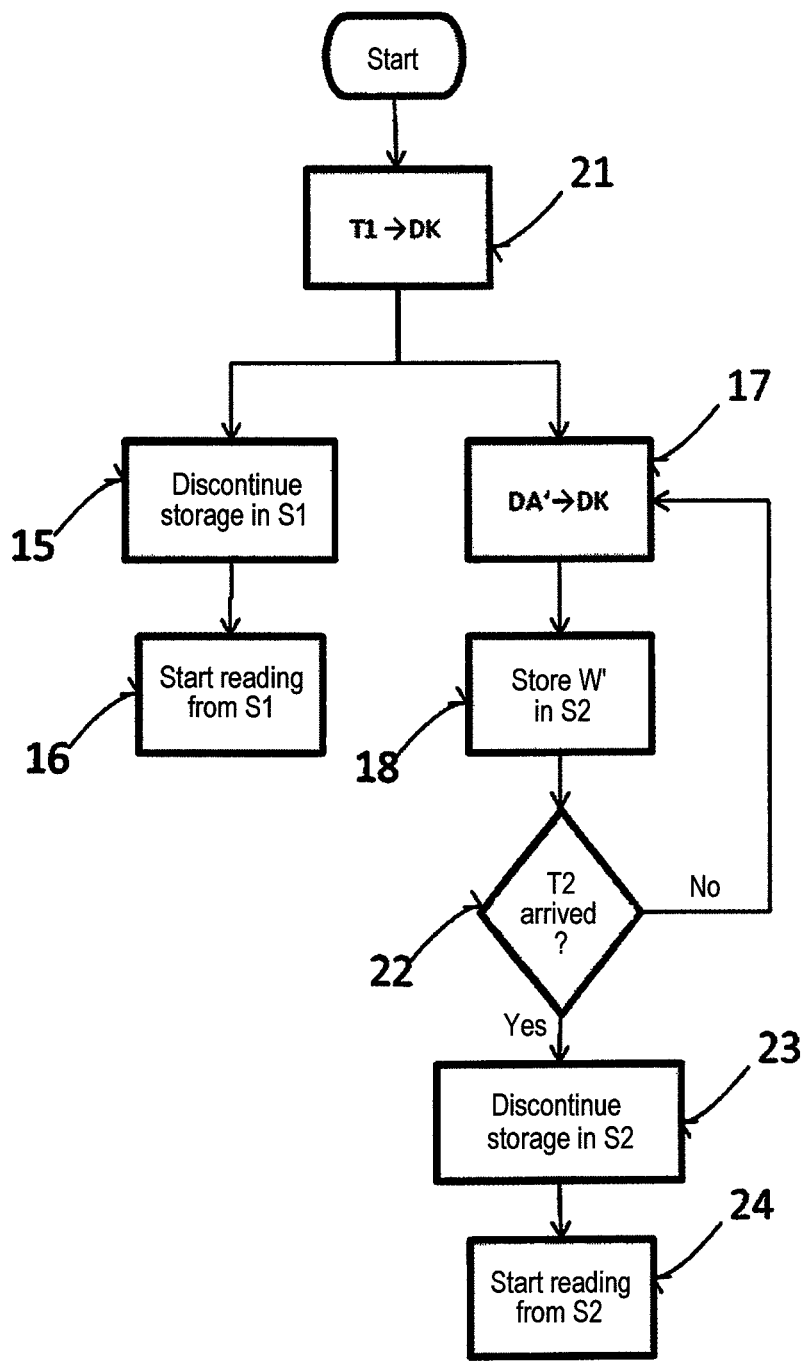
FIG. 2 is a schematic view of a second embodiment of the method according to the invention, shown starting with the arrival of a first trigger.

The illustration in FIG. 2 shows another embodiment of an advantageous method for processing data D of a control unit SG in a data communication device DK. The illustration starts with the presence of the first trigger T1. It does not show steps 11 through 14, which occur, as in the first exemplary embodiment, before the processing of values W of the first memory area S1 in the presence of a first trigger T1.

In a step 21, a first trigger T1 is present in the data communication device DK and is identified by the data communication device DK as a first trigger.

Corresponding to steps 15 and 16 of the first exemplary embodiment, the storage of additional values W' that reach the data communication device DK after the presence of the first trigger T1 is discontinued, and the readout of the values W is started, while additional values W', which are transmitted to the data communication device DK in step 17, are stored in the memory area S2 by step 18.

Then, in step 22, the data communication device DK tests whether a second trigger T2 is present, preferably in the same manner as in step 14 in the first exemplary embodiment.

If no second trigger T2 is present, the values W' of the data D transmitted from the control unit SG continue to be stored in the second memory area S2 or in the additional memory areas.

If a second trigger T2 is present, the storage in the second memory area S2 is discontinued according to a step 23, and the readout from the second memory area S2 is started in a step 24.

If the data communication device DK has more than two memory areas, the method preferably is augmented by execution of steps 21-24 for each additional memory area and each additional trigger.

In another embodiment that is not shown, the readout of values from the memory areas of the data communication device takes place in parallel with multiple data acquisition units. A data acquisition unit is, for example, an FPGA, a separate processor, or a core of a multicore processor. When a first trigger T1 is present, a first data acquisition unit reads out the values W from the first memory area S1, and when a second trigger T2 T1 is present, a second data acquisition unit reads out the values W from the second memory area S2, independently of the process of reading out from the first memory area S1.

Figure 3:
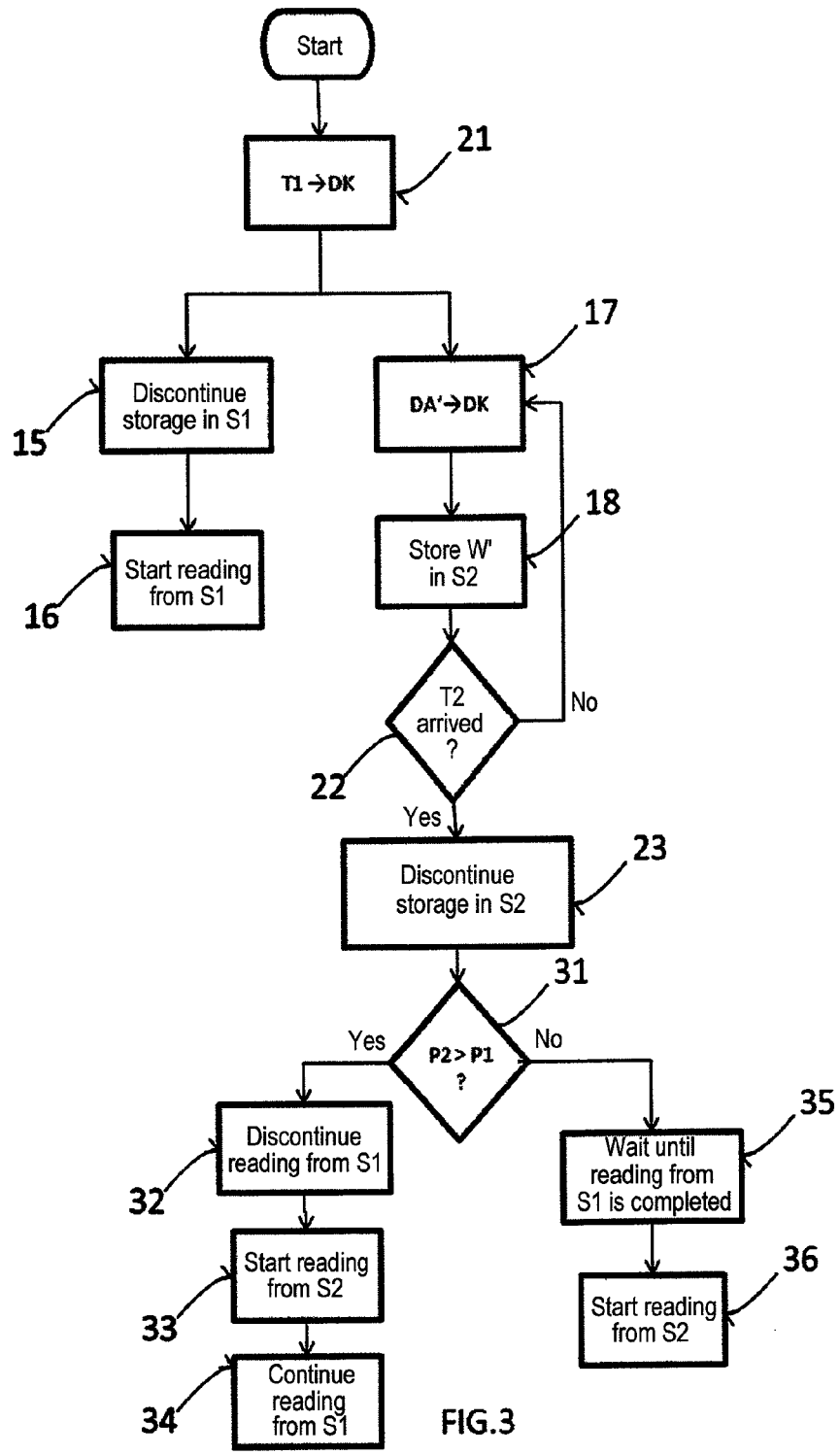
FIG. 3 is a schematic view of a third and fourth embodiment of the method according to the invention with prioritized triggers.

The illustration in FIG. 3 shows another embodiment of an advantageous method for processing data D of a control unit SG in a data communication device DK. Only the differences from the illustration in FIG. 2 are explained below.

In the exemplary embodiment from FIG. 3, a first priority P1 is associated with a trigger T1 and a second priority P2 is associated with a trigger T2. A higher priority here indicates preferential readout of the values W associated with the higher priority trigger.

After discontinuation of storage in the second memory area S2 according to step 23, in a step 31 the data communication device DK tests whether the first priority P2 of the trigger T2 is higher than the second priority P1 of the first trigger T1.

If the priority is not higher, in a step 36 a readout of the values W from the second memory area S2 does not take place until after full readout of the values W from the first memory area according to a step 35.

If the second priority P2 of the trigger T2 is higher than the first priority P1 of the first trigger T1, after step 32 the readout of the values W from the first memory area S1 is discontinued. Then, in a step 33, the values W are read out of the second memory area S2.

According to another embodiment, the continued readout of the values W from the first memory area S1 is not resumed in a step 34 until after the full readout of the values W from the second memory area S2.

In another embodiment that is not shown, when there are more than two memory areas, multiple discontinuations of the readout of a memory area are also possible, caused by higher priority triggers at an additional memory area or at multiple additional memory areas, for example.

In an embodiment, in the case that more readout processes are to be carried out than data acquisition units are available, the readout process whose triggers have the lowest associated priorities is discontinued, and a readout process whose trigger has a higher associated priority is started.

In another embodiment, the values read out of one of the memory areas of the data communication device are transmitted to a data processing device for further processing. In an embodiment, the values that are read out are transmitted in prioritized form to the data processing device so that values that have been read out whose associated trigger has a lower priority than a trigger of a still unfinished readout process are not transmitted to the device until the values of the still unfinished readout process, with which the higher priority triggers are associated, have been transmitted to the data processing device.

Figure 4:
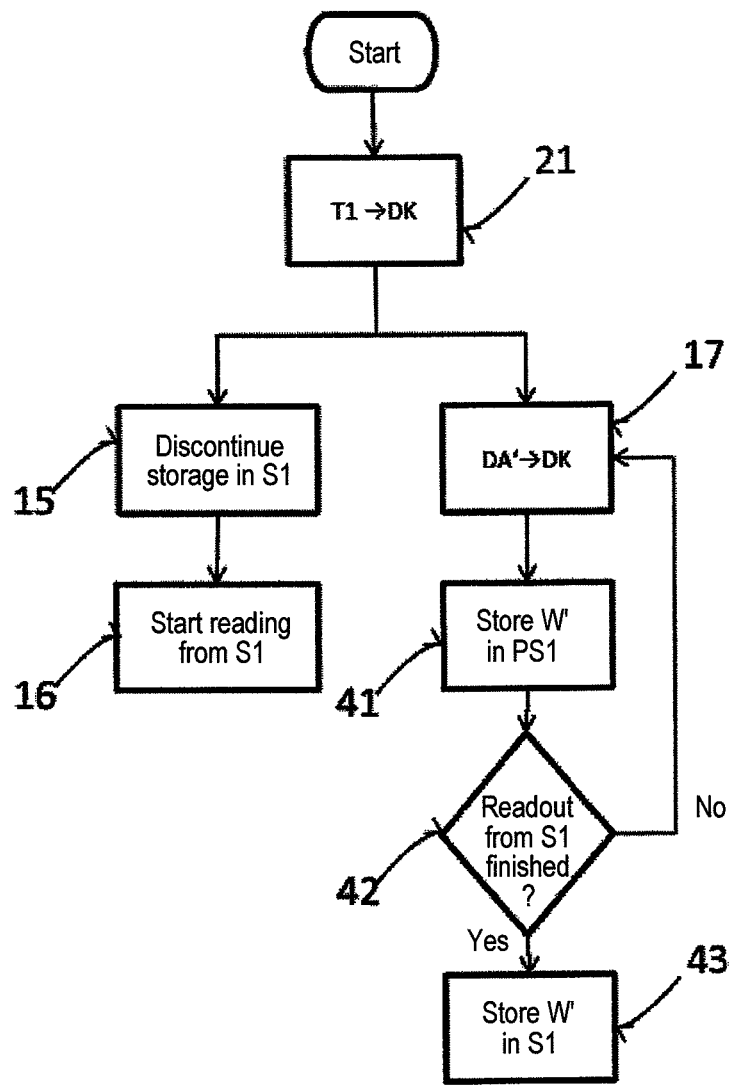
FIG. 4 is a schematic view of a fifth embodiment of the method according to the invention with buffering of the values during the readout of a memory area, shown starting with the arrival of the first trigger.

The illustration in FIG. 4 shows another embodiment of an advantageous method for processing data D of a control unit SG in a data communication device DK.

In this illustration, the steps 21 and 15 through 17 correspond to the steps 21 and 15 through 17 of the exemplary embodiment in FIG. 2.

In an additional step 41, additional values W' of data DA', which are transmitted from the control unit SG to the data communication device DK after the discontinuation of the first memory area S1, are buffered in a buffer memory PS1 associated with the first memory area S1 in addition to being stored in additional memory areas S2. A buffer memory of this nature is preferably implemented as a First-In-First-Out (FIFO) memory. For example, the buffer memory is a separate memory or a memory area of a memory, for instance with one input and multiple outputs.

In a step 42, a test is performed whether the readout of the values W from the first memory area S1 is finished.

Not until after full readout of the relevant values W from the first memory area S1 are the additional values W' stored in the first memory area S1 in a step 43.

In an embodiment, the data communication device DK has a buffer memory for each memory area. For example, the values are temporarily stored in the buffer memory prior to storage in one of the memory areas. In particular, in the case when storage of values W in the first memory area S1 is discontinued, the additional values W' are written to the first buffer memory PS1, and in the case when storage of values W in the second memory area S2 is discontinued, additional values W' are written to a second buffer memory PS2. When there are additional memory areas, additional values are stored accordingly in additional buffer memories upon discontinuation.

If, in another embodiment, a trigger arrives at a data communication device DK while all existing memory areas have discontinued the storage of values, the readout of the values W associated with this trigger does not take place until after storage of the additional values W' from one of the buffer memories in the associated memory area.

In another embodiment, a trigger is associated with a memory area. For example, the association is stored or linked to the trigger.

Figure 5:
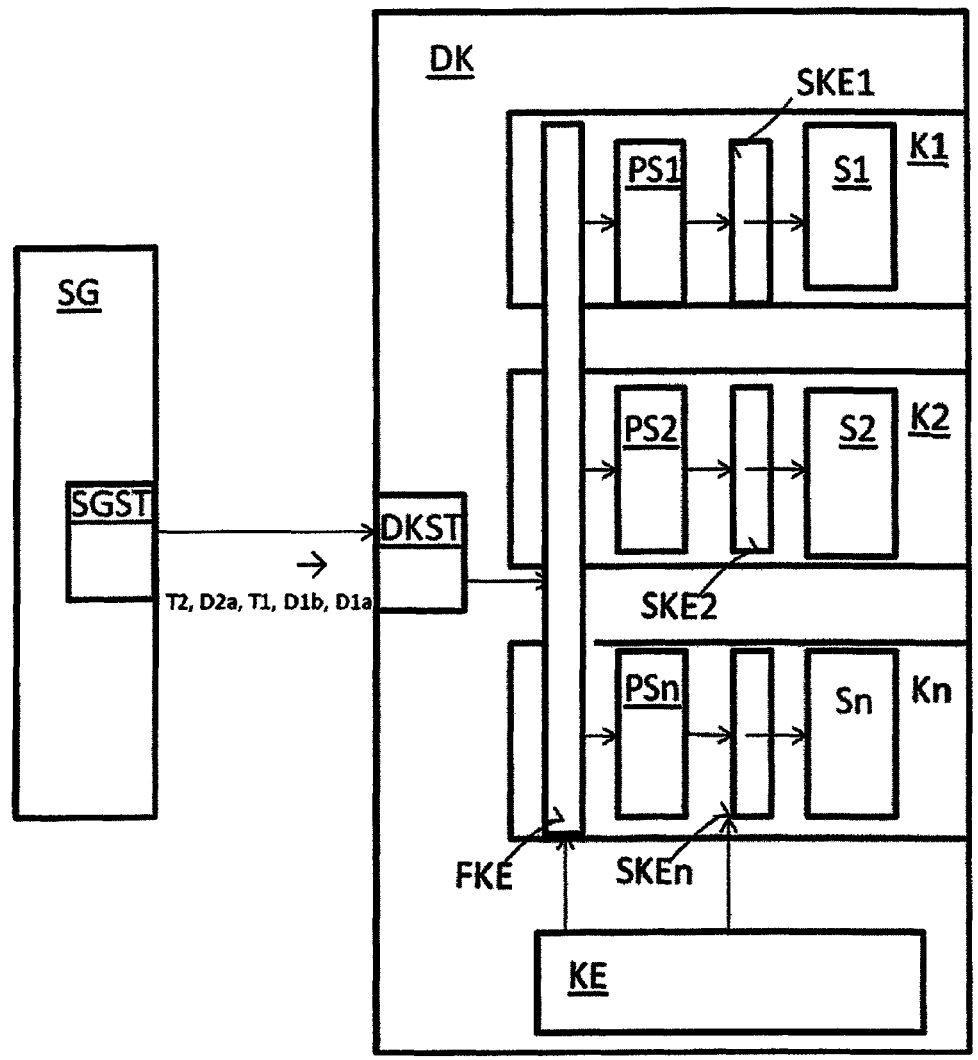
FIG. 5 is a schematic view of the structural layout of a control unit and of a data communication device according to the invention.
Figure 6:
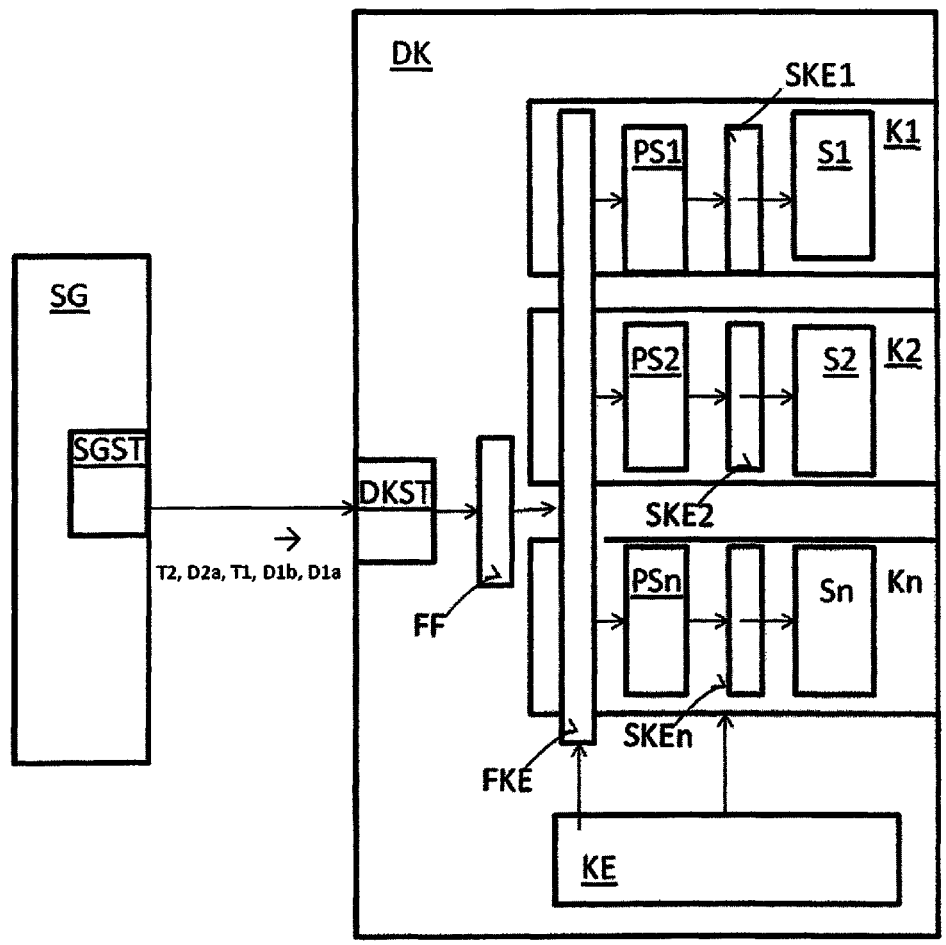
FIG. 6 is a schematic view of the structural layout of a control unit and of a data communication device according to the invention with an upstream common buffer memory.

The following example implementation counts as this embodiment and the embodiment of the buffer memories associated with the memory areas. The corresponding structure of the system is shown in FIG. 5 and FIG. 6. In the following, let n be an arbitrary number greater than 1. A data communication device DK has n memory channels, wherein an arbitrary memory channel of the n memory channels is designated memory channel Kx. The memory channel Kx includes a FIFO PSx, which is to say a First-in-first-out memory, which serves as a buffer memory, a memory control unit SKx, and a memory area Sx.

Assumption at start:

The memory area Sx is not blocked for the storage of values.

The memory control unit SKx is set for pass-through and routes data from the FIFO PSx onward into the applicable associated memory area Sx.

The FIFO PSx is empty.

Steps of the method:

The control unit SG writes the data item D1a in the control unit memory and sends this data item to the trace interface of the data communication device DKST through the control unit trace interface SGST.

The data item D1a is received by a FIFO IN control unit FKE. Since it is a normal data item, the value is written into the FIFOS PS1 through PSn.

The applicable memory control units SKx each receive the value of D1a from their associated FIFOs PSx and write it into the associated memory area Sx. In this process, the memory control units Sk1 through SKn perform arbitration in the transmission of the data from the FIFO PSx into the memory area Sx, which has the result that the memory control units Sk1 through SKn transmit the value of D1a to the applicable memory areas Sx in alternation. Alternatively, in the case of memory areas that each have separate inputs, the memory control units Sk1 through SKn write the values into the memory areas S1 through Sn in parallel.

Once each memory control unit SK1 through SKn has had one turn, the data record D1a is present in all memory areas S1 through Sn.

During this sequence or at a later time, the control unit SG writes additional data D1b, D1c. These data are processed in the same manner.

For example, the data item D1d is a configured trigger event. In this case, the entry T1 is inserted in the data D by the data communication device DK.

This entry is now received by the FIFO IN control unit FKE. The FIFO IN control unit FKE checks which memory channel Kx is free. Memory channel K1 is selected, for example. The trigger T1 is now provided with an additional piece of information K1 and written into the FIFOs PS1 through. PSn as T1/K1, so that the trigger T1 only initiates the readout of the values W relevant to the first trigger T1 once. If PS1 through PSn are separate FIFOs, writing into the selected memory channel FIFO PS1 is also sufficient. The information that the memory channel K1 is occupied by the trigger T1 is stored in an additional control unit KE.

During steps 6 and 7, additional data D2x are transmitted to the data communication device DK, and these data are likewise transmitted into the FIFOs PS1 through PSn.

When the trigger T2 arrives at the FIFO IN control unit FKE, the FIFO IN control unit FKE ascertains through the additional control unit KE that the memory channel K1 is not available for the trigger T2. Now the memory channel K2, for example, is selected for the trigger T2 and the trigger information T2/K2 is written into the FIFOs PS1 through PSx. In an embodiment, the channel Kx with the lowest loading is selected, wherein the lowest loading is ascertained based on the lowest fill level of the FIFO PSx, for example.

If additional triggers Tx are received, this process is continued. In the event that all existing memory channels K1 through Kn are occupied, the FIFO IN control unit FKE waits for a memory channel Kx to become free. In advantageous manner, the FIFO IN control unit FKE stores the trigger Tx in a FIFO FF provided for this purpose. In an especially advantageous implementation, the fill level of the FIFO FF is monitored, and in the event of imminent overflow, the blocking of writing of the values into the memory areas S1 through Sn is rescinded. It is true that this causes additional values to arrive in the memory areas S1 through Sn, and a consistent readout may potentially be impeded. As long as this is a brief overload and the FIFO FF did not have any data loss, consistent values can again be read out at a later time. If the blocking is not rescinded, then in the event of a data loss consistent readout is no longer possible depending on the data item that is lost, and the control unit SG would have to be restarted or a separate data synchronization of the control unit memory with the memory areas S1 through Sn would have to be carried out.

In parallel with steps 8 through 10, the following steps are carried out on the FIFO output side in the memory control unit SKx:

The data record T1/K1 arrives at the memory control unit SK1. Since the memory control unit SK1 and T1/K1 have identical identifiers "1", the memory control unit SK1 recognizes that the trigger T1 is intended for the memory channel K1. At the channels K2 through Kn, it is recognized that the trigger T1 is not intended for the channels, and it is discarded.

In contrast, the memory control unit SK1 receives the trigger information of the trigger T1 and blocks the memory area S1 for further write access. A readout of the relevant values W from the first memory area S1 is started by the additional control unit KE.

In an alternative embodiment, the occupancy of a channel for a trigger is stored outside the channels.

Once the readout from the first memory area S1 has ended, the memory control unit SK1 and the FIFO IN control unit FKE are informed of the end of the readout process through the additional control unit KE.

The memory control unit SK1 enables the writing of additional values W' into the memory area 51, and the FIFO IN control unit FKE enables the memory channel K1 for additional triggers.

A second trigger T2 is treated in the memory channel K2 like the first trigger T1.

Regardless of the preceding example, in another embodiment an upstream buffer memory FF, in particular a FIFO memory, may be provided in addition to the buffer memories that are associated with the memory areas.

Figure 7:
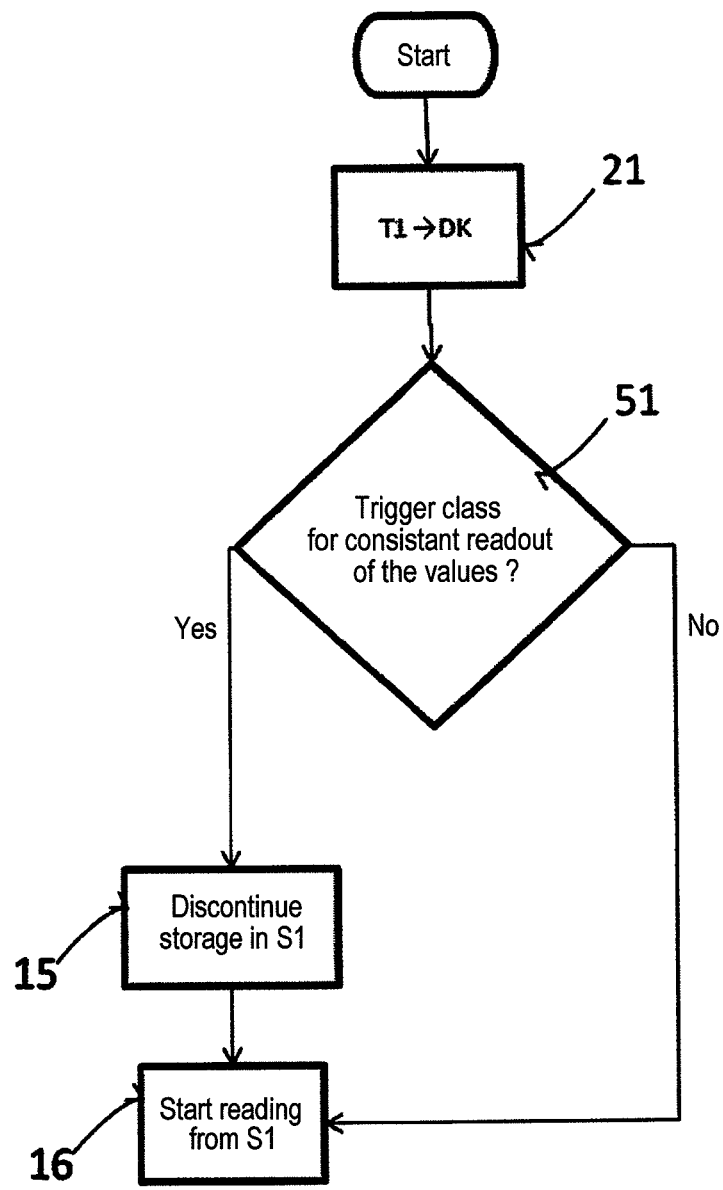
FIG. 7 is a schematic view of a sixth embodiment of the method according to the invention with optional consistent readout of the values from a memory area.
Figure 8:
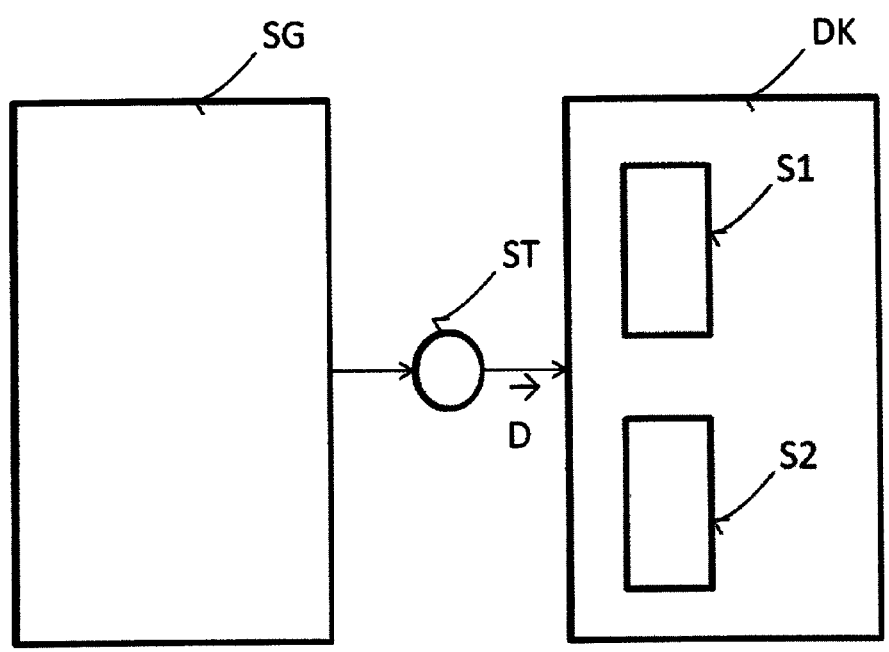
FIG. 8 is a schematic view of the structural layout of a control unit and of a data communication device according to the prior art.
Figure 9:
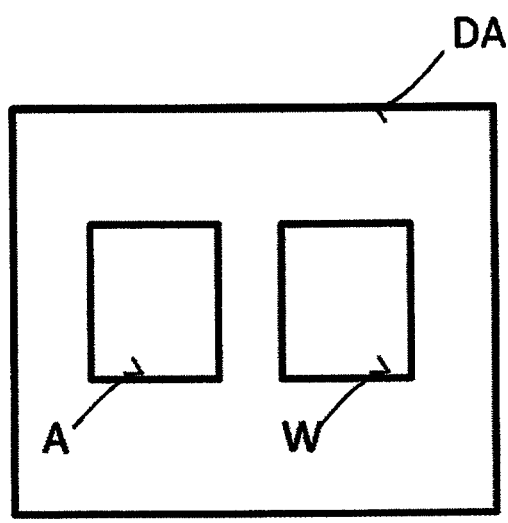
FIG. 9 is a schematic view of the structural layout of a data item according to the prior art.

In another alternative embodiment, shown in FIG. 7, each trigger has a trigger class, wherein a trigger class is defined by a trigger number, for example. As a function of the trigger class, the values are read out in a manner that is consistent or not consistent. To this end, in the case of triggers with a trigger class for consistent readout, the corresponding memory area is locked for readout of the relevant values. In the case of a trigger of the trigger class that does not require consistent readout of the associated values, the values associated with the trigger are read out of the memory area without writing into the memory area being discontinued.

In another embodiment that is not shown, the readout of values from a memory area can be discontinued by a writing of data into the control unit by the data communication device, hereinafter referred to as stimulation.

In another embodiment that is not shown, the stimulation of data by the data communication device takes place in parallel to the readout of values from a memory area.

A stimulus is initiated by a stimulus trigger, for example. In another embodiment, a priority is associated with each stimulus trigger. In an embodiment, a stimulus can discontinue another stimulus if the stimulus trigger of the first stimulus has a higher priority than the stimulus trigger of the second stimulus. In another embodiment, a stimulus whose stimulus trigger has a higher priority than a trigger for readout of values can discontinue the readout of values.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing data of a control unit in a data communication device, the data communication device comprising a first memory area and a second memory area and is connectable to the control unit through an interface, the method comprising:
   transmitting data from the control unit to the data communication device through the interface, each data item of the data has an address and a value;
   storing an identical value in both the first memory area and the second memory area; and
   testing, via the data communication device, whether a first trigger is present, if the first trigger is present:
      storage in the first memory area is discontinued, or the trigger class of the first trigger is tested and storage in the first memory area is discontinued in the presence of a predefined trigger class,
      values of the data stored in the first memory area are read out from the first memory area; and
      additional values arriving chronologically after the first trigger are stored in the second memory area by the data communication device,
   wherein after the additional values arriving chronologically after the first trigger are stored in the second memory area, the data communication device tests whether a second trigger is present, and if the second trigger is present, storage in the second memory area is discontinued,
   wherein the first trigger has a first priority and the second trigger has a second priority,
   wherein after the storage in the second memory area is discontinued, determining if the second priority is higher than the first priority,
   wherein if the second priority is higher than the first priority, the readout of the values of the first memory area is discontinued, the readout of the values of the second memory area is started and the readout of the values of the first memory area is resumed after the readout of the values of the second memory area, and
   wherein if the first priority is higher than the second priority, the readout of the values of the first memory area continues until completion and then the readout of the values of the second memory area is started.

2. The method according to claim 1, wherein each value is stored identically in the first memory area and in the second memory area until the first trigger is present.

3. The method according to claim 1, wherein addresses of the first memory area and/or of the second memory area are associated with the first trigger, and wherein, in the presence of a second trigger, addresses of the first memory area and/or of the second memory area are associated with the second trigger.

4. The method according to claim 3, wherein the data communication device is connectable to a data processing device, wherein data are transmitted to the data processing device via the data communication device, and wherein values that are read out from the first memory area or from the second memory area whose addresses are associated with the first trigger and the first trigger having a lower priority than the second trigger of a still unfinished readout process are not transmitted to the data processing device until the values whose addresses are associated with the second trigger have been transmitted to the data processing device.

5. The method according to claim 1, wherein a value in the first memory area obtains a first memory address, wherein a value in the second memory area obtains a second memory address, and wherein the address of the second memory area is obtained for a value in that a predefined address value is added to the first memory address.

6. The method according to claim 1, wherein the control unit is an electronic control unit.

7. A method for processing data of a control unit in a data communication device, the data communication device comprising a first memory area and a second memory area and is connectable to the control unit through an interface, the method comprising:
- transmitting data from the control unit to the data communication device through the interface, each data item of the data has an address and a value;
- storing an identical value in both the first memory area and the second memory area; and
- testing, via the data communication device, whether a first trigger is present, if the first trigger is present:
  - storage in the first memory area is discontinued, or the trigger class of the first trigger is tested and storage in the first memory area is discontinued in the presence of a predefined trigger class,
  - values of the data stored in the first memory area are read out from the first memory area; and
  - additional values arriving chronologically after the first trigger are stored in the second memory area by the data communication device,
- wherein the data communication device has a first buffer memory that is associated with the first memory area, and wherein, during the discontinuation of storage in the first memory area, values of the data arriving chronologically after the first trigger are buffered in the first buffer memory in addition to the second memory area.

8. The method according to claim 7, wherein, during the discontinuation of storage in the first memory area, values of the data arriving chronologically after the first trigger are buffered in the first buffer memory and the buffered values of the data are stored in the first memory area after the readout from the first memory area.

9. The method according to claim 8, wherein the first buffer memory is associated with the first memory area and a second buffer memory is associated with the second memory area, and wherein the first buffer memory and the second buffer memory are each implemented as a separate memory or as a part of a memory with multiple outputs.

10. The method according to claim 8, wherein a common third buffer memory is arranged upstream of the first buffer memory and the second buffer memory.

11. A method for processing data of a control unit in a data communication device, the data communication device comprising a first memory area and a second memory area and is connectable to the control unit through an interface, the method comprising:
- transmitting data from the control unit to the data communication device through the interface, each data item of the data having an address and a value;
- storing an identical value in both the first memory area and the second memory area;
- identifying a first trigger;
- discontinuing storage in the first memory area;
- reading out values of the data stored in the first memory area; and
- storing, in the second memory area, additional values arriving chronologically after the identification of the first trigger,
- wherein the data communication device has a first buffer memory that is associated with the first memory area, and wherein, during the discontinuation of storage in the first memory area, values of the data arriving chronologically after the first trigger are buffered in the first buffer memory in addition to the second memory area.

* * * * *